US012006041B2

(12) United States Patent
Corvaglia et al.

(10) Patent No.: US 12,006,041 B2
(45) Date of Patent: Jun. 11, 2024

(54) BOX-SHAPED MONOLITHIC STRUCTURE IN COMPOSITE MATERIAL FOR FUSELAGES AND WINGS OF AIRCRAFT AND METHOD FOR MANUFACTURING SAID STRUCTURE

(71) Applicant: LEONARDO S.p.A., Rome (IT)

(72) Inventors: Stefano Giuseppe Corvaglia, Grottaglie (IT); Nicola Gallo, Grottaglie (IT); Danila Fuggiano, Grottaglie (IT)

(73) Assignee: LEONARDO S.p.A. (IT)

( * ) Notice: Subject to any disclaimer, the term of this patent is extended or adjusted under 35 U.S.C. 154(b) by 23 days.

(21) Appl. No.: 17/183,877

(22) Filed: Feb. 24, 2021

(65) Prior Publication Data

US 2021/0261236 A1  Aug. 26, 2021

(30) Foreign Application Priority Data

Feb. 26, 2020 (IT) .................. 102020000003976

(51) Int. Cl.
*B64C 5/02* (2006.01)
*B29C 70/44* (2006.01)
(Continued)

(52) U.S. Cl.
CPC .............. *B64C 5/02* (2013.01); *B29C 70/446* (2013.01); *B64C 1/00* (2013.01); *B64C 1/12* (2013.01);
(Continued)

(58) Field of Classification Search
CPC . B64C 70/446; B64C 3/24; B64C 2001/0072; B29K 2105/0872
See application file for complete search history.

(56) References Cited

U.S. PATENT DOCUMENTS 3,795,559 A * 3/1974 Horn ...................... B29D 25/00
156/173
5,454,895 A * 10/1995 Imparato .............. B29D 24/004
425/389
(Continued)

FOREIGN PATENT DOCUMENTS

| EP | 0582160 | 2/1994 |
| WO | WO2012/06444 | 5/2012 |
| WO | WO2014/184814 | 11/2014 |

*Primary Examiner* — Michael H Wang
(74) *Attorney, Agent, or Firm* — The Belles Group, P.C.

(57) ABSTRACT

The invention relates to a method for manufacturing a box-shaped monolithic structure with a cavity by curing a fiber-reinforced prepreg material. The method comprises using two or more elongated and internally hollow support tools which have a complementary form to that of the cavities to be manufactured, and a composition based on reinforcement material and polymer suitable to allow the passage from a rigid state to a flexible elastomeric state and vice versa in response to heating/cooling down. In the rigid state, the support tools allow the direct lamination of the prepreg material on their external walls and are configured to set the flexible elastomeric state at a temperature lower than the curing temperature and higher than 50° C. During the curing operation, the curing pressure is applied both outside the structure being formed and inside the support tools, whose walls have become flexible, to push on the prepreg material to be cured.

20 Claims, 6 Drawing Sheets

(51) Int. Cl.
    *B64C 1/00*         (2006.01)
    *B64C 1/12*         (2006.01)
    *B64C 3/18*         (2006.01)
    *B64C 3/24*         (2006.01)
    *B64C 3/26*         (2006.01)
    *B29K 63/00*       (2006.01)
    *B29K 105/08*     (2006.01)
    *B29L 31/30*       (2006.01)

(52) U.S. Cl.
    CPC ............... *B64C 3/185* (2013.01); *B64C 3/24* (2013.01); *B64C 3/26* (2013.01); *B29K 2063/00* (2013.01); *B29K 2105/0872* (2013.01); *B29L 2031/3085* (2013.01); *B64C 2001/0072* (2013.01)

(56) References Cited

U.S. PATENT DOCUMENTS

| | | | |
|---|---|---|---|
| 6,896,841 B2* | 5/2005 | Velicki | B29C 66/112 |
| | | | 264/102 |
| 8,815,044 B2* | 8/2014 | Inserra Imparato | ........................ |
| | | | B29D 99/0007 |
| | | | 156/286 |
| 8,815,145 B2* | 8/2014 | Everhart | B29C 33/3857 |
| | | | 264/516 |
| 9,017,510 B2* | 4/2015 | Hansen | B29C 66/73756 |
| | | | 156/286 |
| 9,751,256 B2* | 9/2017 | Zivich | B29C 66/721 |
| 10,384,401 B2* | 8/2019 | Frasca | B29C 66/131 |
| 10,391,684 B1* | 8/2019 | Margraf, Jr. | B29C 43/003 |
| 10,449,733 B2* | 10/2019 | Iagulli | B29C 70/443 |

\* cited by examiner

BOX-SHAPED MONOLITHIC STRUCTURE IN COMPOSITE MATERIAL FOR FUSELAGES AND WINGS OF AIRCRAFT AND METHOD FOR MANUFACTURING SAID STRUCTURE

CROSS-REFERENCE TO RELATED APPLICATIONS

This Patent application claims priority from Italian Patent Application No. 102020000003976 filed on Feb. 26, 2020, the entire disclosure of which is incorporated herein by reference.

TECHNICAL FIELD

The present invention relates to a box-shaped monolithic structure in composite material for fuselages and wings of an aircraft, in particular for a horizontal stabilizer of an airplane, to which the following description will make explicit reference without thereby losing generality.

The present invention also relates to a method for manufacturing the aforesaid box-shaped monolithic structure.

BACKGROUND

As is known, a horizontal stabilizer is a structural component with fixed surfaces which is generally part of the tail portion of the fuselage of an airplane.

The stabilizer has inside it a box-shaped monolithic structure in composite material and essentially comprising: an upper wall; a lower wall facing the upper wall and spaced a non-zero amount apart from the latter; and a plurality of interconnection elements or spars extending between the upper and lower walls and delimiting between them and with the aforesaid upper and lower walls respective elongated cavities each extending, between a front opening and a rear opening arranged on planes transversal to the walls themselves and to the spars.

The use of composite material reduces the overall weight of aircraft while simultaneously obtaining very strong structures.

The upper and lower walls are approximately parallel and more precisely slightly converging between them toward the front openings or toward the rear openings.

The spars are constituted by partitions which are substantially orthogonal, or more generally transversal, to the upper and lower walls.

The structure described is manufactured by means of a known method which comprises the steps indicated below starting from a prepreg with a thermosetting matrix (resin) reinforced by fibers of different nature such as carbon fibers, aramidic fibers, glass fibers, etc.

First of all, each spar, in the prepreg condition, is preformed on suitable preforming tools by making two elongated profiled bars having C sections and constituted by a back and two wings protruding orthogonally from the opposite end edges of the back; in order to form a spar, the two C-shaped profiled bars are joined together along the respective backs so as to have opposing concavities.

In particular, each C-shaped profiled bar is laminated on three flat faces of a preforming tool with a substantially parallelepiped profile; a first face of the tool is completely coated by the prepreg, while two other faces adjacent to the first face, orthogonal to the latter and parallel to each other, are coated only for a stretch.

After the necessary vacuum consolidation and at a predetermined temperature, the C-shaped profiled bars are joined two by two in the manner described above so as to form the desired number of spars, which are held in position and at the predetermined distance for the subsequent step of curing by respective rigid support tools having the shape of elongated pins.

The preforming operation is a vacuum and temperature application process that allows the prepreg material to acquire a consolidated shape without undergoing a polymerization process.

Each support tool is constituted by a substantially parallelepiped, rigid and solid elongated body, delimited by flat faces and having a cross section corresponding to the shape of the elongated cavities of the structure to be manufactured.

Before positioning each spar, still in the form of a preformed prepreg, between two support tools, the latter are subjected to a dressing operation consisting of the following successive steps: applying a layer of separating agent, for example in the form of a film, to each support tool to facilitate the subsequent extraction of the support tool itself from the respective elongated cavity; fitting on each support tool thus prepared a tubular bag leaving an excess of the latter at each end of the support tool itself for a subsequent sealing operation; wrapping on each support tool and outside the tubular bag a ventilation fabric, fixing the flaps thereof with a sealant; fitting on each support tool thus prepared a tubular separator film, leaving also in this case an excess of the latter at each end of the support tool itself for the subsequent sealing operation; sealing the ends of the tubular bag and of the tubular separator film by means of a sealant; and applying the vacuum and waiting for the tubular separator film to shrink the entire dressing on the relative support tool.

At this point, the preformed spars, each constituted by two C-shaped profiled bars joined together along the respective backs, are positioned between the support tools previously subjected to the above-described dressing operation; in particular, each preformed spar is arranged so that: the backs of the relative pair of C-shaped profiled bars that constitute it are interposed between two facing flat faces of two mutually adjacent support tools; and the wings of each profiled bar rest on respective flat faces of the relative support tool, parallel to each other and substantially orthogonal to the flat face that supports the back of the profiled bar itself.

The assembly thus formed constituted by the preformed spars and the previously dressed support tools is inserted in a forming mold including a lower plate, an upper plate and two opposite side walls connecting the lower and upper plates. In particular, on each of the two upper and lower plates one or more layers of prepreg material are laminated, which are destined to define the upper and lower skins which will constitute, after the curing step, the upper and lower walls of the box-shaped structure to be manufactured. More precisely, on the lower plate of the forming mold carrying the lower skin, the preformed spars held in position by the respective support tools are positioned; subsequently, the upper plate of the forming mold carrying the upper skin is closed on the side walls of the mold itself and on the assembly constituted by the preformed spars and the support tools. At this point, a separator film, a ventilation fabric and a bag film are arranged in succession on the entire forming mold; the bag film is sealed by means of sealant at the base of the forming mold.

The tubular separator film arranged on each support tool is opened at its ends; the part in excess in length with respect to the relative support tool is cut. The tubular bags on the respective support tools are unwound at the ends and sealed. The so-called envelope bag is thus formed, by sealing the edge of the external bag film arranged on the forming mold with the ends of the tubular bags of the support tools and also by sealing the ends of the adjoining tubular bags. At this point the vacuum is applied inside the envelope bag until the material of the external bag is shrunk toward the outer surface of the forming mold.

The ends of the tubular bags are then opened and, by continuing to apply the vacuum, the tubular bags themselves are detached from the respective support tools, tending to minimize the volume enclosed inside the envelope bag.

At this point the support tools are extracted and the assembly thus formed is brought to autoclave to carry out the curing operation at determined pressure and temperature values (for example for epoxy resins, the curing temperature is about 180° C. and the curing pressure is between 6 and 7 bar).

The method described and the tools used allow to correctly position the preforms and to maintain their position during the closing operations of the mold for forming and manufacturing the envelope bag. The extraction of the support tools before the curing cycle prevents the tools, under the conditions of pressure and temperature necessary for the curing, from being deformed in an inadequate way so as to ensure the uniform application of the pressure on all the parts in composite material. The tubular bags instead allow a uniform application of the pressure on the composite parts that they contact.

However, the Applicant has observed that the method described and the box-shaped structure obtained by means of the same are susceptible of improvements. In particular, the need to simplify the method in order to make it more efficient and less expensive is felt in the field; moreover, the finishing quality of the surfaces, in particular those inside the box-shaped structure, requires further improvements.

BRIEF SUMMARY

The aim of the present invention is to provide a method for manufacturing a box-shaped monolithic structure in composite material for a fuselage of an aircraft, which is highly reliable and of limited cost, satisfies at least one of the requirements specified above, and connected with the methods for manufacturing box-shaped monolithic structures in composite material of known type.

According to the invention, this aim is achieved by a method for manufacturing a box-shaped monolithic structure in composite material for a fuselage of an aircraft as claimed in claim 1.

A further aim of the present invention is to manufacture a box-shaped monolithic structure in composite material for a fuselage of an aircraft, which has a high finishing quality and allows to satisfy the needs specified above.

According to the invention, this aim is achieved by a box-shaped monolithic structure in composite material for a fuselage of an aircraft as claimed in claim 9.

BRIEF DESCRIPTION OF THE DRAWINGS

For a better understanding of the present invention, a preferred, non-limiting embodiment thereof is described below, purely by way of example and with the aid of the accompanying drawings, in which.

DETAILED DESCRIPTION

Figures 1, 2:
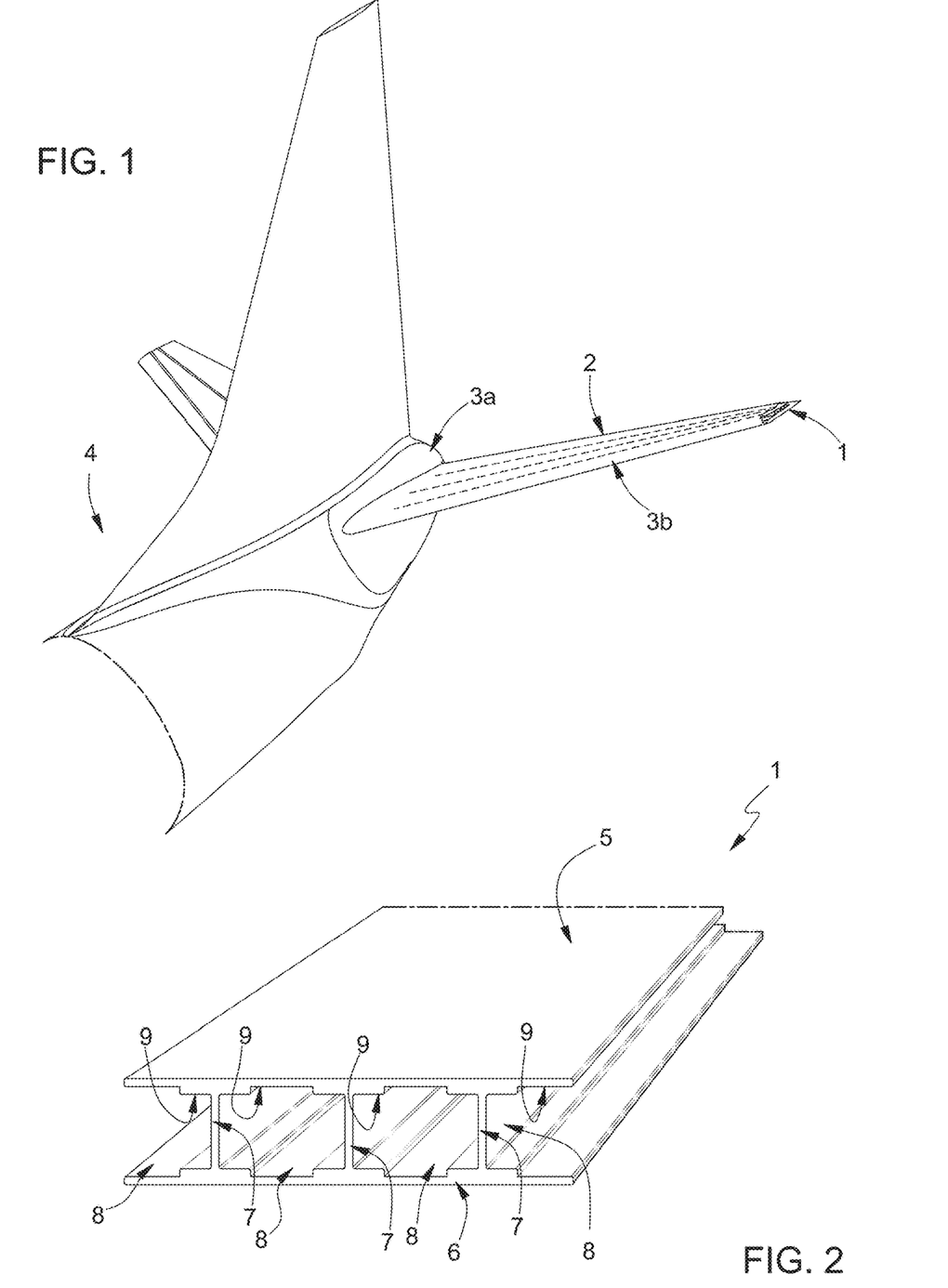
FIG. 1 is a perspective view of a tail part of an airplane, incorporating inside it a box-shaped monolithic structure in composite material, manufactured according to the teachings of the present invention.
FIG. 2 shows a perspective view, with enlarged scale, with parts removed for clarity's sake, of the box-shaped monolithic structure of FIG. 1.

With reference to FIGS. 1 and 2, the reference numeral 1 generally denotes a box-shaped monolithic structure in composite material for a fuselage of an aircraft, in particular for a horizontal stabilizer 2 of a fuselage 3 of an airplane, for example of an airplane 4.

The structure 1 (FIG. 2) essentially comprises: an upper wall 5; a lower wall 6 facing, along its surface with larger extension, the surface with larger extension of the upper wall 5 and spaced a non-zero amount apart from the latter; and a plurality of interconnection elements or spars 7 extending between the upper 5 and lower 6 walls and delimiting between them and with the aforesaid upper 5 and lower 6 walls a series of elongated cavities 8 extending, each, between respective front and rear openings 9 (only the front openings visible in FIG. 2) arranged on planes that are transversal to the walls 5, 6 themselves and to the spars 7.

The upper 5 and lower 6 walls are, in the example shown, approximately parallel to each other. According to a possible alternative not shown, the upper 5 and lower 6 walls could also be slightly converging between them toward the front or rear openings 9.

The spars 7 are constituted by partitions which are substantially orthogonal, or more generally transversal, to the upper 5 and lower 6 walls and are elongated in a longitudinal direction substantially parallel to the upper 5 and lower 6 walls.

The structure 1 is made from a prepreg with a polymeric matrix, for example made of thermosetting resin, reinforced by fibers which may have different nature, such as for example carbon fibers and/or aramidic fibers and/or glass fibers, etc.

Alternatively, the structure 1 could also be made from a matrix prepreg made of thermoplastic resin reinforced by fibers of the type indicated above.

In both cases, the upper 5 and lower 6 walls are made starting from respective skins 5a, 6a (FIG. 5) in the aforesaid fiber-reinforced prepreg, laminated on respective flat surfaces, as will be described in greater detail below.

Figure 3:
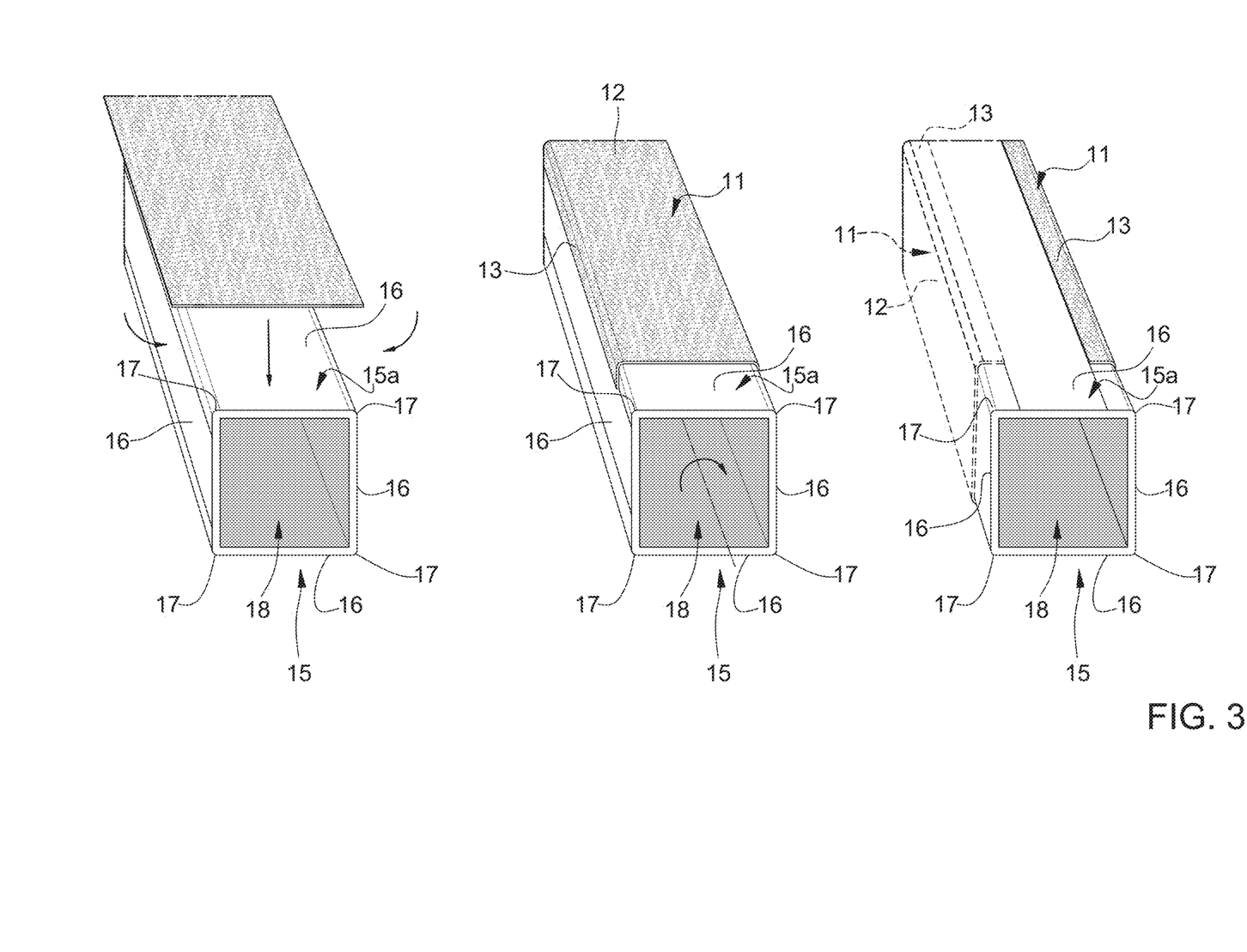
FIG. 3 is a perspective view of a support tool in successive steps during an operation of lamination of a part of a spar of the structure of FIGS. 1 and 2.
Figure 4:
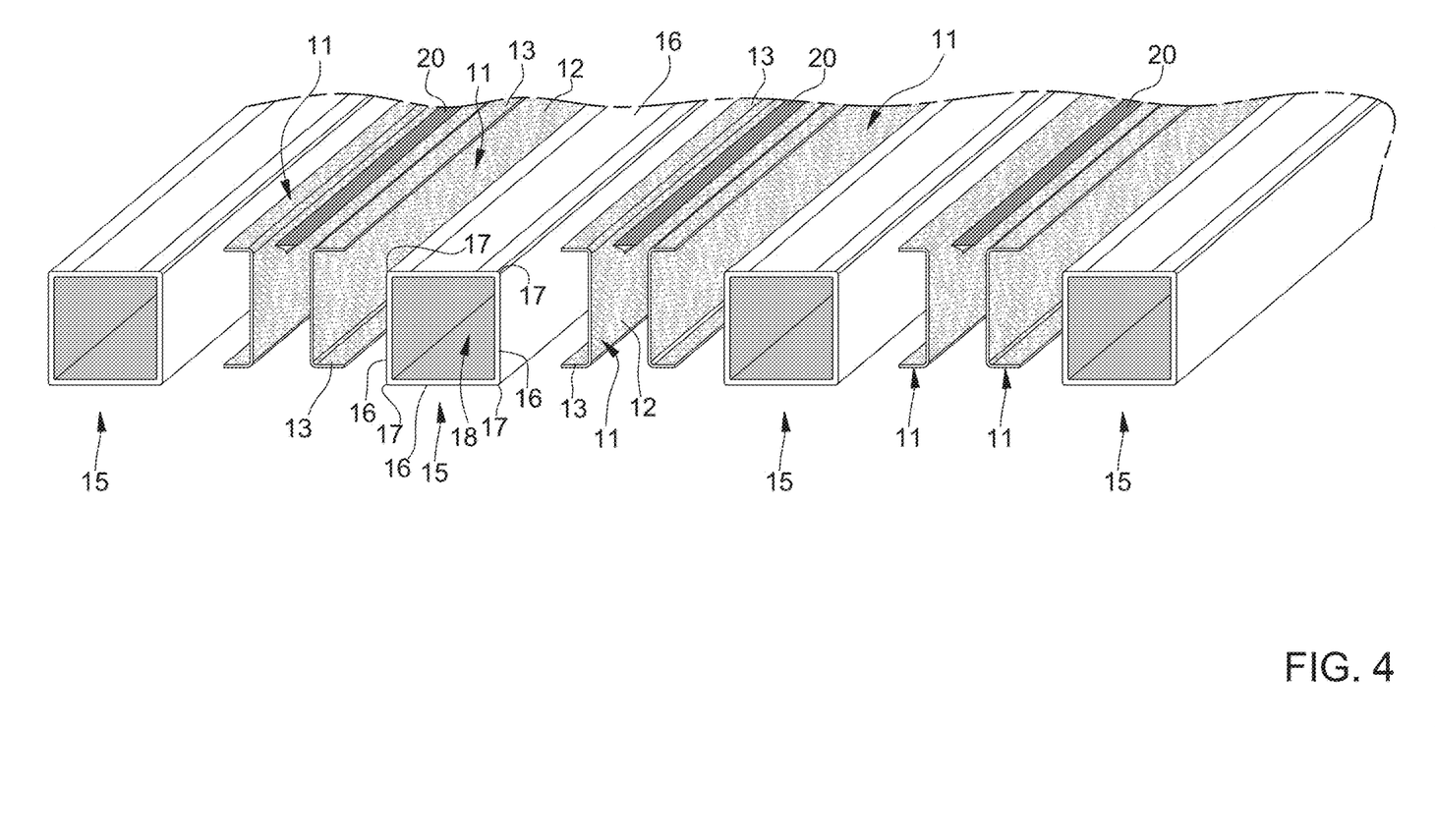
FIG. 4 is an exploded perspective view with reduced scale of a series of support tools of FIG. 3 during the assembly of a plurality of spars of the structure of FIGS. 1 and 2.

With reference to FIGS. 3 and 4, each spar 7 is obtained starting from two profiled bars 11 that are elongated in the said longitudinal direction, having C-shaped sections and each constituted by a back 12 and by two end appendices 13 protruding transversely in a substantially orthogonal direction from the opposite end edges of the back 12 itself and arranged on the same side thereof. In particular, in order to form a spar 7, the two profiled bars 11 are joined together along the respective backs 12 so as to have opposing concavities.

Advantageously, the profiled bars 11 in the aforesaid prepreg material are laminated on respective support tools 15 elongated in the said longitudinal direction, which are subsequently destined to maintain the spars 7 in the predefined positions inside the structure 1 during the manufacturing step and which have a composition based on reinforcement material and polymer suitable to allow the passage from a rigid state to a flexible elastomeric state and vice versa in response to heating and respectively to a cooling down, i.e. in response to a temperature stimulus.

The polymer constituting the support tools 15 is advantageously a thermosetting or thermoplastic polymer with shape memory of a known type. The polymer may be, for example, an epoxy polymer with shape memory, a cyanate ester polymer with shape memory, a polyurethane polymer with shape memory, a vinyl polymer with shape memory, a polyimide polymer with shape memory, a maleimide polymer with shape memory, or combinations thereof, including copolymers. Thanks to the properties of the polymer with shape memory, the support tools 15 can recover their original rigid shape despite an extensive repeated use and after numerous heating and cooling down cycles.

The reinforcing material of the support tools 15 includes one or more elastic fibers. In particular, the reinforcing material may also contain nylon fibers, lycra fibers, polyester fibers, carbon fibers, glass fibers, aramidic fibers, boron fibers, basalt fibers, polymer fibers, chopped fibers, meshes, three-dimensional fiber preforms, normal weft fabrics, twill fabrics, or other types of fabric and combinations thereof. A suitable commercial example of nylon fibers is the nylon produced by Invista (Wichita, Kans.). The support tools 15, in some embodiments, may contain two or more different types of reinforcing materials.

With reference to FIGS. 3 to 7, each support tool 15 has a parallelepiped shape that is elongated in the said longitudinal direction and hollow in the same direction. In particular, each support tool 15 has a cross section with an external polygonal profile complementary to the profile of the respective cavity 8 to be formed in the structure 1. In the example shown, each support tool 15 is delimited by four side walls 16 parallel two by two and each orthogonal to the two adjacent walls 16. The walls 16 are connected to each other by beveled edges 17 and delimit a longitudinal through cavity 18 of the respective support tool 15.

Each profiled bar 11 is laminated externally on three adjoining walls 16 of the relative support tool 15 in the rigid state after application of a resin-based adhesive agent (known as "tackifier"). In particular, a wall 16 of the support tool 15 in the rigid state is completely coated by the prepreg of the relative profiled bar 11, while two other walls 16 adjacent thereto are coated only for a predetermined stretch. Each support tool 15 can therefore support on opposite sides two prepreg C-shaped profiled bars 11.

Thanks to its rigid state, it is possible to lay one or more prepreg layers on each support tool 15; moreover, thanks to their composition, it is not necessary to dress the support tools 15 before laminating the profiled bars 11. After the profiled bars 11 have been laid on the respective walls 16 of each support tool 15, the latter is enclosed and sealed in an external bag (known per se and not shown) in which the vacuum is then applied in a known manner in order to obtain the compaction of the profiled bars 11 themselves. At this point, by approaching or placing side by side laterally to each other the support tools 15 carrying externally the respective compacted prepreg profiled bars 11 (FIG. 4), it is possible to join the profiled bars 11 themselves two by two along the respective backs 12 so as to form the spars 7, which are then kept at the desired distance the ones from others by the support tools 15. In particular, each prepreg spar 7 is arranged so that: the backs 12 of the relative pair of profiled bars 11 that constitute it are interposed between two facing walls 16 of two support tools 15 adjacent to each other; and the end appendices 13 of each profiled bar 11 rest on respective walls 16 of the relative support tool 15, substantially parallel to each other and substantially orthogonal to the wall 16 that supports the back 12 of the profiled bar 11 itself.

Since the flat walls 16 of each support tool 15 are joined by beveled edges 17, the profiled bars 11 assume the same external shape as the walls 16 themselves on which they are laid and as the beveled edge 17 that joins them. Therefore, a recess 19 is formed between each pair of adjacent coplanar end appendices 13 which has an approximately V-shaped cross section. The recesses 19 are filled by respective prepreg filling beads 20 or noodles (FIGS. 4 and 5) having a profile complementary to that of the recesses 19 themselves.

Figure 5:
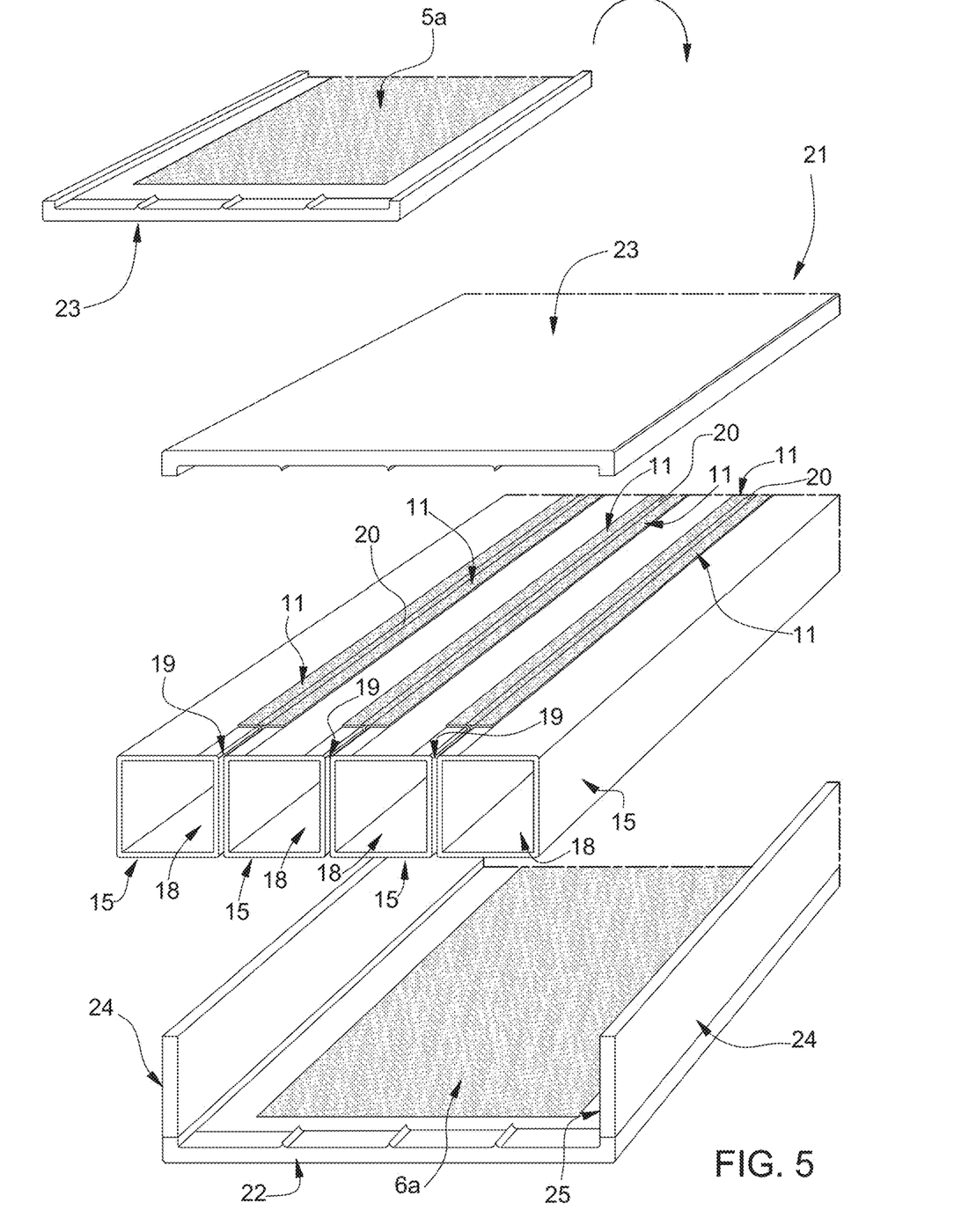
FIG. 5 is an exploded perspective view of a forming mold, which is used to manufacture the structure of FIGS. 1 and 2 and in which, for this purpose, a series of support tools of FIG. 3 is destined to be inserted.

The assembly thus formed constituted by the prepreg spars 7, by the support tools 15 which hold them in position and by the filling beads 20 is inserted in a forming mold 21 including a lower plate 22, an upper plate 23 and two opposite side plates 24 connecting the lower plate 22 and the upper plate 23 (FIG. 5). In particular, the forming mold 21 is internally hollow and therefore has, at the front and at the rear, respective end openings 25 (only the front one is visible in FIG. 5) delimited by respective frame front 27 and rear 28 surfaces defined by the opposite head edges of the lower, upper and side plates 22, 23, 24.

In detail, on each of the two lower and upper plates 22, 23, one or more layers (called "plies") of fiber-reinforced prepreg material, of the type described above, are laminated destined to define the upper 5a and lower 6a skins which will constitute, after the curing step, the upper 5 and lower 6 walls of the structure 1 to be manufactured. More precisely, on each of the lower and upper plates 22, 23 a resin-based adhesive agent (known as "tackifier") is applied beforehand and the various layers of fiber-reinforced prepreg material are then laminated. This adhesive agent is applied at least to the parts of the lower and upper plates 22, 23 destined to receive the fiber-reinforced prepreg material. Preferably, after laminating a predetermined number of layers, for example every four layers, a vacuum compacting step is carried out by wrapping the relative lower 22 or upper plate 23 and the prepreg in a sealed bag (known per se and not shown), inside which the vacuum is applied in a known manner. At this point, the preformed spars 7 and the filling beads 20 held in position by the respective support tools 15 are positioned on the lower plate 22 of the forming mold 21 carrying the lower skin 6a.

Figure 6:
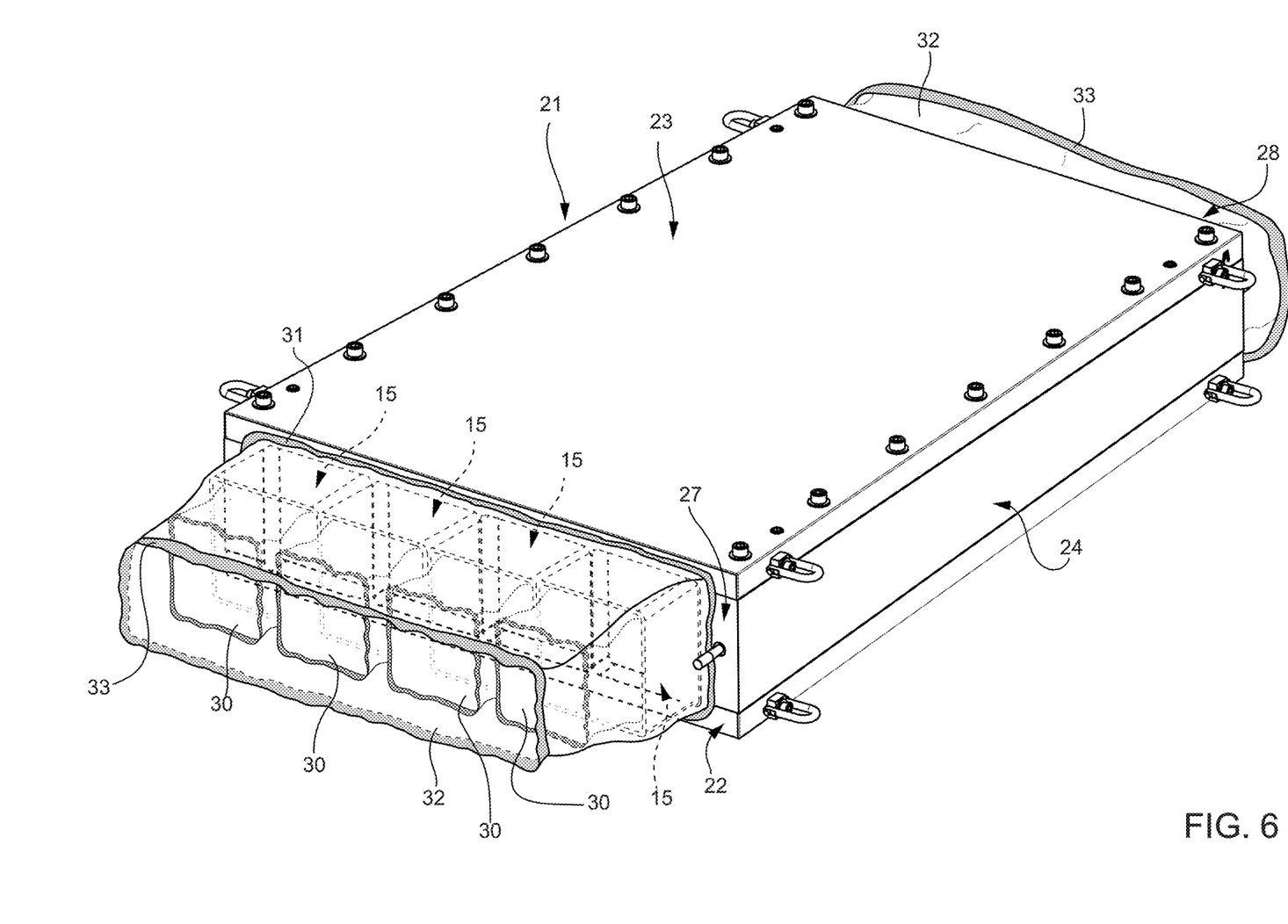
FIGS. 6 and 7 are perspective views with enlarged scale of the forming mold of FIG. 5 during successive steps of the method for manufacturing the structure of FIGS. 1 and 2. ss
Figure 7:
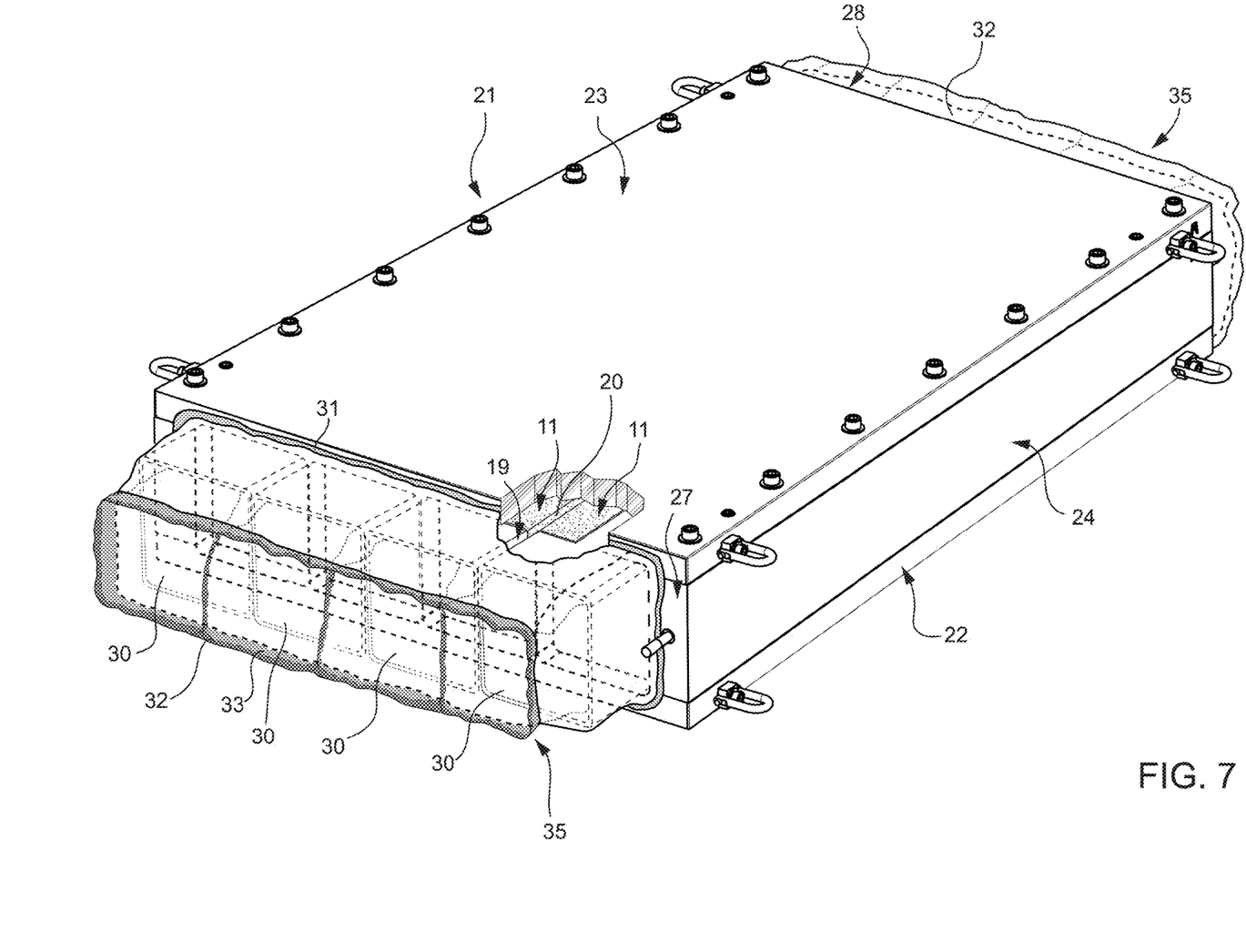

Subsequently, the upper plate 23 of the forming mold 21, carrying the upper skin 5a, is closed on the side plates 24 of the forming mold 21 itself and on the assembly constituted by the preformed spars 7, by the filling beads 20 and by the support tools 15. In this condition (FIGS. 6 and 7), the support tools 15 protrude with respective front and rear end portions 15a (only the front portions are visible in FIGS. 6 and 7) from the front and rear openings 25 of the forming mold 21. A ventilation fabric (known per se and not shown)

and a tubular bag 30 protruding at the front and at the rear from the support tool 15 itself are then inserted inside each support tool 15 itself.

On each of the front 27 and rear 28 frame surfaces, an axial end 31 of a further external tubular bag 32 suitable for positioning itself in use around the respective front 15a or rear end portions 15 of the support tools 15, is sealed by sealant. At this point, the ends of the tubular bags 30 protruding at the front from the respective support tools 15 are sealed by sealant to an axial end 33 of the relative external tubular bag 32 opposite the axial end 31; an identical sealing operation is carried out between the relative external tubular bag 32 sealed at the rear of the forming mold 21 and the ends of the tubular bags 30 protruding at the rear from the respective support tools 15. All the ends of the adjoining tubular bags 30 are then closed and sealed together. In this way the so-called envelope bags, front and rear, each indicated with the reference number 35, are formed.

The forming mold 21 thus prepared, together with the support tools 15, the upper and lower skins 5a, 6a, the spars 7, the filling beads 20 and the envelope bags 35, is brought to autoclave to carry out the curing operation at predetermined pressure and temperature values (for example, for epoxy resins, the curing temperature is about 180° C. and the curing pressure is between 6 and 7 bar).

During the curing step, the walls 16 of the support tools 15, due to the temperature stimulus, pass from the rigid state to the flexible elastomeric state. In fact, the support tools 15 are configured to set the flexible elastomeric state at a temperature lower than the curing temperature and higher than 50° C. The curing pressure acts both outside the structure 1 being formed and inside the support tools 15 and therefore inside the cavities 8 of the structure 1 itself through the tubular bags 30 which thus push on the walls 16 made flexible by the change of state. As a result of the curing pressure, the walls 16 then push uniformly on the prepreg material that polymerizes. Once the curing step has been completed, the support tools 15 are heated again to pass to the flexible elastomeric state so as to be able to be extracted from the cavities 8 of the structure 1 just formed.

As a result of the method described above and in particular of the use of the support tools 15 which pass from the rigid state to the flexible elastomeric state during the curing operation, it is possible to obtain a structure 1 having on all the surfaces included between the upper wall 5 and the lower wall 6 an average surface roughness smaller than or equal to 2 microns. This result is particularly important because it allows smooth surfaces to be obtained on the structure 1 which provide a precise and stable abutment for the connection of devices or other structures of the fuselage 3 of the airplane 4.

The method described is simplified and faster than those known, since the profiled bars 11 are laminated directly on the support tools 15 and not on special preforming tools, and then transferred onto the support tools. Moreover, it is not necessary to extract the support tools 15 before the curing step, since these tools set a flexible elastomeric state during the curing operation, thus pressing uniformly on the prepreg material.

Clearly, changes may be made to the method and structure 1 as described and illustrated herein without, however, departing from the scope of protection defined by the claims.

The invention claimed is:

1. A method for manufacturing a box-shaped monolithic structure for fuselages and wings of an aircraft using a prepreg material comprising a fiber-reinforced polymer matrix, said box-shaped monolithic structure comprising:
   an upper wall;
   a lower wall facing said upper wall and spaced a non-zero amount apart from the upper wall; and
   at least one interconnection element extending transversely between said upper and lower walls, connected to them and delimiting with the upper and lower walls themselves respective elongated cavities;
   said method comprising the steps of:
   a) providing at least two elongated support tools, each having a cross section with an external polygonal profile complementary to the profile of the cavities to be formed in said box-shaped monolithic structure;
   b) externally disposing, on three adjoining walls of each support tool, an elongated profiled bar made of said prepreg material, having a C-shaped cross section and comprising a back and two end appendices protruding transversely from said back and arranged on the same side of the back itself;
   c) joining said elongated profiled bars along the respective backs placing side by side said elongated support tools so that the elongated profiled bars themselves have opposing concavities to form an assembly;
   d) laminating one or more layers of said prepreg material on a lower plate of a forming mold to form a lower skin destined to constitute said lower wall of said box-shaped monolithic structure;
   e) inserting the assembly of step c) on said lower skin carried by said lower plate of said forming mold and between respective side plates delimiting the forming mold itself; said elongated profiled bars being arranged with respective end appendages coplanar in contact with said lower skin;
   f) laminating one or more layers of said prepreg material on an upper plate of said forming mold to form an upper skin destined to constitute said upper wall of said box-shaped monolithic structure;
   g) mounting said upper plate on said side plates of said forming mold in a position facing said lower plate so that said upper skin is placed in contact with the end appendages of said profiled bars opposite the end appendages in contact with the lower skin;
   h) bringing to autoclave the forming mold thus prepared and filled with the upper and lower skins and with the profiled bars to carry out a curing operation at predefined curing temperature and pressure;
   wherein:
   said elongated support tools are internally hollow and have a composition based on reinforcement material and polymer suitable to allow a transition from a rigid state to a flexible elastomeric state upon a heating and to allow a transition from the flexible elastomeric state to the rigid state upon a cooling;
   said elongated support tools are configured to set the flexible elastomeric state at a temperature lower than the curing temperature and higher than 50° C.;
   step b) is carried out by laminating the said prepreg material directly onto the external surface of the walls of said elongated support tools in a rigid state; and
   during phase h), the curing pressure is applied both inside the forming mold and inside said elongated support tools, whose walls are made flexible by the passage from the rigid state to the flexible elastomeric state and are therefore pushed by the curing pressure itself to adhere to said profiled bars and to said lower and upper skins.

2. The method according to claim 1, further comprising, preliminary to step h), the steps of:
   i) inserting inside each elongated support tool at least one tubular bag protruding from respective opposite front and rear end portions of the elongated support tool itself;
   l) Sealing, at each of the opposite front and rear ends of the forming mold, a first axial end of a respective external tubular bag suitable for positioning in use around the respective front or rear end portions of the elongated support tools protruding from the forming mold itself; and
   m) sealing the adjoining ends of the tubular bags protruding from the respective elongated support tools to each other and to the respective second axial ends of the relative tubular external bags opposite the first axial ends; said curing pressure being applied inside said tubular bags.

3. The method according to claim 1, wherein step b) is preceded only by a step n) of applying a first resin-based adhesive agent at least on the parts of the walls of the elongated support tools in the rigid state destined to receive said prepreg material.

4. The method according to claim 1, wherein steps d) and f) are preceded by a step o) of applying a second resin-based adhesive agent at least on the part of said lower and upper plates of said forming mold destined to receive said prepreg material.

5. The method according to claim 1, wherein the polymer of said elongated support tools is a thermosetting or thermoplastic polymer with shape memory.

6. The method according to claim 1, wherein the reinforcing material of said elongated support tools includes one or more elastic fibers.

7. The method according to claim 1, wherein at least two interconnection elements are formed; wherein in said step a) at least three said elongated support tools are provided; and wherein, in said step b), on the walls of at least one of said elongated support tools two said profiled bars are laminated directly on opposite sides.

8. The method according to claim 1, further comprising, after step h), a step p) of heating the elongated support tools to bring them to the flexible elastomeric state and extract them from the respective cavities of the box-shaped monolithic structure just formed.

9. A method for manufacturing a box-shaped monolithic structure for fuselages and wings of an aircraft comprising:
   a) providing at least two elongated support tools that are formed of a reinforcement material and a polymer, whereby the polymer transitions from a rigid state to a flexible elastomeric state upon a heating and transitions from the flexible elastomeric state to the rigid state upon a cooling, each of the elongated support tools are internally hollow and extend along a longitudinal axis, the elongated support tool comprising a plurality of walls extending along the longitudinal axis and include at least a first external surface, a second external surface, and a third external surface, whereby the first external surface is orthogonal to the second external surface, and whereby the second external surface is orthogonal to the third external surface,
   b) externally disposing an initial layer of a prepreg material comprising a fiber-reinforced polymer matrix material onto the second external surface of each elongated support tool and subsequently shaping the initial layer of the prepreg material in-situ on the elongated support tool to form a shaped prepreg material that conforms to the plurality of walls of the elongated support tool, the shaped prepreg material having a C-shaped cross-section and the combination of the shaped prepreg material and elongated support tool resulting in an elongated profiled bar that comprises:
      a back of the shaped prepreg material adjacent to the second external surface of the elongated support tool,
      a first end appendices of the shaped prepreg material adjacent to first external surface of the elongated support tool, and
      a second end appendices of the shaped prepreg material adjacent to the third external surface of the elongated support tool;
   c) joining said elongated profiled bars along the respective backs placing side by side said elongated support tools so that the elongated profiled bars themselves have opposing concavities to form an assembly;
   d) laminating one or more lower layers of said prepreg material on a lower plate of a forming mold to form a lower skin;
   e) inserting the assembly of step c) on said lower skin carried by said lower plate of said forming mold and between respective side plates delimiting the forming mold itself; said profiled bars being arranged with respective end appendages coplanar in contact with said lower skin;
   f) laminating one or more upper layers of said pre-impregnated material on an upper plate of said forming mold to form an upper skin;
   g) mounting said upper plate on said side plates of said forming mold in a position facing said lower plate so that said upper skin is placed in contact with the end appendages of said profiled bars opposite the end appendages in contact with the lower skin;
   h) bringing to autoclave the forming mold thus prepared and filled with the upper and lower skins and with the profiled bars to carry out a curing operation at predefined curing temperature and pressure;
   wherein the elongated support tools transition into the flexible elastomeric state at a temperature lower than the predefined curing temperature and higher than 50° C.;
   step b) is carried out by laminating the said initial layer of prepreg material directly onto the second external surface said elongated support tools in a rigid state; and
   during phase h), the curing pressure is applied both inside the forming mold and inside said elongated support tools, whereby the plurality of walls transition to the flexible elastomeric state and are therefore pushed by the curing pressure to adhere to said elongated profiled bars and to said lower and upper skins.

10. The method according to claim 9, further comprising, preliminary to step h), the steps of:
   i) inserting inside each elongated support tool at least one tubular bag protruding from respective opposite front and rear end portions of the elongated support tool itself;
   l) Sealing, at each of the opposite front and rear ends of the forming mold, a first axial end of a respective external tubular bag suitable for positioning in use around the respective front or rear end portions of the elongated support tools protruding from the forming mold itself; and
   m) sealing the adjoining ends of the tubular bags protruding from the respective elongated support tools to each other and to the respective second axial ends of the relative tubular external bags opposite the first axial ends; said curing pressure being applied inside said tubular bags.

11. The method according to claim 9, wherein step b) is preceded only by a step n) of applying a first resin-based adhesive agent at least on the parts of the walls of the elongated support tools in the rigid state destined to receive said prepreg material.

12. The method according to claim 9, wherein the box-shaped monolithic structure comprises:
an upper wall;
a lower wall facing said upper wall and spaced a non-zero amount apart from the upper wall; and
at least one interconnection element extending transversely between said upper and lower walls, connected to them and delimiting with the upper and lower walls themselves respective elongated cavities.

13. The method according to claim 12, wherein each elongated support tools has a cross section with an external polygonal profile complementary to the profile of the cavities to be formed in said box-shaped monolithic structure, and wherein the cross section is viewed orthogonal to the longitudinal axis and the external polygonal profile comprises the first external surface, the second external surface, and the third external surface.

14. The method according to claim 12, wherein at least two interconnection elements are formed; wherein in said step a) at least three said elongated support tools are provided; and wherein, in said step b), on the walls of at least one of said elongated support tools two said profiled bars are laminated directly on opposite sides.

15. The method according to claim 12, further comprising, after step h), a step p) of heating the elongated support tools to bring them to the flexible elastomeric state and extract them from the respective cavities of the box-shaped monolithic structure just formed.

16. The method according to claim 12, wherein said lower wall of said box-shaped monolithic structure is formed by the lower skin of step d), and wherein the upper wall of said box-shaped monolithic structure is formed by the upper skin of step e).

17. The method according to claim 9, further comprising step q) occurring after step b) and before step c), step q) comprising rotating each elongated profile bar by 90° along the longitudinal axis.

18. The method according to claim 9, wherein the initial layer of prepreg material of step b) is flat.

19. A method for manufacturing a box-shaped monolithic structure for fuselages and wings of an aircraft:

a) providing at least two elongated support tools each being internally hollow and having an external polygonal profile defined by plurality of external walls, the elongated support tool comprising a polymer and reinforcing material, wherein the polymer transitions from a rigid state to a flexible elastomeric state upon heating and transitions from the flexible elastomeric state to the rigid state upon cooling;
b) laminating a layer of a prepreg material having a first geometry onto at least one of the plurality of external walls of the elongated support tools and subsequently shaping the layer of prepreg material into a second geometry that conforms to the external polygonal profile of the elongated support tool, thereby forming an elongated profiled bar, whereby the second geometry is different from the first geometry;
c) forming an assembly by positioning a plurality of the elongated profiled bars adjacent to each other such that the prepreg material of each elongated profiled bar contacts the prepreg material of an adjacent-most elongated profiled bar;
d) laminating to the assembly one or more lower layers of said prepreg material on a lower plate of a forming mold to form a lower skin;
e) laminating to the assembly one or more upper layers of said pre-impregnated material on an upper plate of said forming mold to form an upper skin;
f) curing the assembly, one or more lower layers, and one or more upper layers in a curing operation in a mold at predefined curing temperature and pressure to form the box-shaped monolithic structure;
wherein the elongated support tools transition into the flexible elastomeric state at a temperature lower than the predefined curing temperature and higher than 50° C.; wherein step b) is carried out by laminating the said initial layer of prepreg material directly onto the external surface said elongated support tools in a rigid state; and
during step f), the curing pressure is applied both inside the mold and inside said elongated support tools, and wherein the plurality of walls transition to the flexible elastomeric state and are therefore pushed by the curing pressure to adhere to said elongated profiled bars and to said lower and upper skins.

20. The method according to claim 19, wherein each elongated profile extends along a longitudinal axis, and the method further comprising step g) occurring after step b) and before step c), step g) comprising rotating each elongated profile bar by 90° along the longitudinal axis.

* * * * *